(12) United States Patent
Caredda et al.

(10) Patent No.: US 12,441,152 B2
(45) Date of Patent: Oct. 14, 2025

(54) METHOD AND SYSTEM FOR CONTROLLING A CHASSIS OF A VEHICLE

(71) Applicant: Dr. Ing. h.c. F. Porsche Aktiengesellschaft, Stuttgart (DE)

(72) Inventors: David Caredda, Ebersbach (DE); Jochen Liebold, Stuttgart (DE); Markus Eisenbarth, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 52 days.

(21) Appl. No.: 18/420,155

(22) Filed: Jan. 23, 2024

(65) Prior Publication Data
US 2024/0246384 A1    Jul. 25, 2024

(30) Foreign Application Priority Data

Jan. 25, 2023   (DE) .................... 10 2023 101 751.9

(51) Int. Cl.
*B60G 17/08*     (2006.01)
*B60G 17/018*    (2006.01)
*B60G 17/019*    (2006.01)

(52) U.S. Cl.
CPC ....... *B60G 17/08* (2013.01); *B60G 17/01908* (2013.01); *B60G 2400/102* (2013.01)

(58) Field of Classification Search
CPC .................. B60G 17/0182; B60G 17/0165
See application file for complete search history.

(56) References Cited

U.S. PATENT DOCUMENTS

| | | | |
|---|---|---|---|
| 6,819,979 B1* | 11/2004 | Schwarz | B60G 17/01908 701/1 |
| 2004/0153226 A1* | 8/2004 | Song | B60G 17/08 701/37 |
| 2005/0241366 A1* | 11/2005 | Sonnenburg | G01M 17/04 73/11.04 |
| 2009/0143945 A1 | 6/2009 | Steinle | |
| 2010/0228422 A1* | 9/2010 | Gartner | B60G 17/018 701/31.4 |

(Continued)

FOREIGN PATENT DOCUMENTS

| | | |
|---|---|---|
| DE | 4303160 A1 | 8/1994 |
| DE | 102007057822 A1 | 6/2009 |

(Continued)

*Primary Examiner* — Long T Tran
(74) *Attorney, Agent, or Firm* — Buchanan Ingersoll & Rooney PC

(57) ABSTRACT

A method for controlling a chassis of a vehicle includes the steps of: detecting a vertical wheel acceleration of a wheel of the vehicle, detecting a vertical body acceleration of a body of the vehicle, determining a crest-dip indication by comparing the vertical wheel acceleration and the vertical body acceleration, and controlling the chassis on the basis of the crest-dip indication. The crest-dip indication indicates whether or not the vehicle is currently driving over a crest (K) or a dip (S). A system for controlling a chassis of a vehicle includes a wheel acceleration sensor for detecting a vertical wheel acceleration of a wheel of the vehicle, a body acceleration sensor for detecting a vertical body acceleration of a body of the vehicle, and a control unit.

14 Claims, 2 Drawing Sheets

(56) References Cited

U.S. PATENT DOCUMENTS

| | | | | |
|---|---|---|---|---|
| 2011/0035103 A1* | 2/2011 | Arenz | ................ | B60G 17/0185 |
| | | | | 701/37 |
| 2015/0039184 A1* | 2/2015 | Voet | .................. | B60G 17/0165 |
| | | | | 701/38 |
| 2019/0217854 A1* | 7/2019 | Park | .................... | B60W 30/045 |
| 2020/0324609 A1 | 10/2020 | Bärecke et al. | | |
| 2021/0402841 A1* | 12/2021 | Furuta | ................ | B60G 17/0165 |
| 2022/0032709 A1* | 2/2022 | Lee | .................... | B60G 17/0165 |
| 2022/0281456 A1* | 9/2022 | Giovanardi | ............ | G06V 20/58 |
| 2022/0324421 A1* | 10/2022 | Giovanardi | .......... | G08G 1/0145 |

FOREIGN PATENT DOCUMENTS

| | | |
|---|---|---|
| DE | 102009053277 B4 | 2/2015 |
| DE | 102016206604 B4 | 1/2020 |

* cited by examiner

METHOD AND SYSTEM FOR CONTROLLING A CHASSIS OF A VEHICLE

CROSS-REFERENCE TO RELATED APPLICATION

This application claims priority to German Patent Application No. 10 2023 101 751.9, filed Jan. 25, 2023, the content of such application being incorporated by reference herein in its entirety.

FIELD OF THE INVENTION

The present invention relates to a method and system for controlling a chassis of a vehicle.

BACKGROUND OF THE INVENTION

Modern vehicles often have an active or partially active chassis that is configured to minimize vertical movement of a body of the vehicle when driving on uneven terrain, in particular by corresponding control of an adjustable damper, in order to create a comfortable driving behavior.

However, such an active chassis can only compensate for unevenness whose height difference is less than an available spring progression and whose extension in the direction of travel is less than a wheelbase of the vehicle. When driving over extended crests or dips, the chassis may therefore move in rebound stops (when driving over a crest) or compression stops (when driving over a dip), which can lead to noticeably uncomfortable driving behavior.

SUMMARY OF THE INVENTION

It would be desirable to enable a particularly comfortable driving behavior of the vehicle.

When driving over a crest or dip, a body of the vehicle and wheels of the vehicle experience substantially equal vertical acceleration. According to aspects of the invention, a vertical wheel acceleration of a wheel of the vehicle and a vertical body acceleration of a body of the vehicle are therefore detected by means of suitably arranged acceleration sensors, and by comparing the vertical wheel acceleration and the vertical body acceleration, a crest-dip indication is determined which indicates whether or not the vehicle is currently driving over a crest or dip. The crest-dip indication can generally be achieved in any desirable manner suitable for indicating whether or not the vehicle is currently driving over a crest or dip. For example, the crest-dip indication could be achieved as an analogue or digital signal or as a variable in a computer program. Preferably, the particular crest-dip indication is suitable for distinguishing between driving over a crest and driving over a dip.

According to the present invention, the chassis is controlled on the basis of the determined crest-dip indication, so that the control when driving over a crest or dip can be adjusted such that movement of the chassis in rebound stops or compression stops is prevented. Doing so enables a particularly comfortable driving behavior of the vehicle.

Given that the body of the vehicle and the wheels of the vehicle are generally accelerated in the same direction when driving over a crest or dip, a sign of the vertical wheel acceleration is preferably compared to a sign of vertical body acceleration to determine the crest-dip indication. Advantageously, the acceleration sensors detecting the vertical wheel acceleration and the vertical body acceleration are configured such that the vertical wheel acceleration and the vertical body acceleration have the same sign when the wheel and the body are accelerated in the same direction. In this case, when determining the crest-dip indication, if the vertical wheel acceleration and vertical body acceleration have the same sign, it is assumed that a crest or dip is being driven over, and if the sign is not the same, it is assumed that no crest or dip is being driven over. If the vertical wheel acceleration and vertical body acceleration have the same sign, the present sign can also be used to distinguish between driving over a crest and driving over a dip.

In order to determine the crest-dip indication, the vertical wheel acceleration and the vertical body acceleration are preferably each compared to a threshold value in order to improve a reliability of determining the crest-dip indication.

Preferably, not only are individual acceleration values compared with each other to determine the crest-dip indication, but rather a progression of vertical wheel acceleration is compared to a progression of vertical body acceleration.

Particularly preferably, low-pass filtering of the progression of the vertical wheel acceleration and the progression of the vertical body acceleration is performed to filter out high-frequency changes in the vertical wheel acceleration or the vertical body acceleration, as caused in particular by driving over uneven ground, and thus to enable a particularly reliable determination of the crest-dip indication.

To enable particularly effective control of the chassis when driving over a crest or dip, preferably on the basis of the vertical wheel acceleration and vertical build acceleration, crest-dip characteristic information is determined, which includes an indication of the characteristic of the crest or dip currently driven over, and the chassis is controlled on the basis of the crest-dip characteristic information.

Typically, a progression of a compression speed of a spring-damper device of the vehicle is determined in order to control the chassis. Preferably, depending on the particular crest-dip indication and/or the particular crest-dip characteristic information, low pass filtering of the progression of the compression speed is performed or not performed. Preferably, low-pass filtering of the progression of the compression speed is performed when the crest-dip indication indicates that a crest or dip is currently being driven over and the crest-dip characteristic information indicates that the crest or dip has a defined minimum extent. Typically, a progression of a body speed of the body of the vehicle is determined in order to control the chassis. Preferably, depending on the particular crest-dip indication and/or the particular crest-dip characteristic information, high pass filtering of the progression of the body speed is performed or not performed. Preferably, high-pass filtering of the progression of the body speed is performed when the crest-dip indication indicates that a crest or dip is currently being driven over, and the crest-dip characteristic information indicates that the crest or dip has a defined minimum extent.

Particularly preferably, depending on the particular crest-dip indication and/or the particular crest-dip characteristic information, both low-pass filtering of the progression of the compression speed and high-pass filtering of the progression of the body speed are provided, whereby a corner frequency of the low-pass filtering of the progression of the compression speed is equal to a corner frequency of the high-pass filtering of the progression of the body speed.

The vertical wheel acceleration is preferably detected in a wheel support associated with the corresponding wheel. Doing so enables simple and reliable detection of the vertical wheel acceleration.

The vertical body acceleration is preferably detected in a damper strut dome associated with the wheel whose vertical wheel acceleration is detected, and thus in close proximity to the corresponding wheel. Doing so enables particularly reliable determination of the crest-dip indication and/or the crest-dip characteristic information.

Preferably, the vertical wheel acceleration of all four wheels of the vehicle is detected and, in order to determine the crest-dip indication, each vertical wheel acceleration is compared to a body acceleration.

Particularly preferably, vertical wheel accelerations of wheels of a front axle are compared with a first threshold value in order to determine the crest-dip indication, and wheel accelerations of wheels of a rear axle are compared with a second threshold value that is not equal to the first threshold value.

The system according to the present invention comprises a wheel acceleration sensor for detecting a vertical wheel acceleration of a wheel of the vehicle and a body acceleration sensor for detecting a vertical body acceleration of a body of the vehicle. The system according to the present invention preferably comprises four-wheel acceleration sensors, each arranged on one of the four wheels of the vehicle, and four body acceleration sensors, each arranged near one of the four wheels on the body of the vehicle. The wheel acceleration sensors are preferably each arranged on a wheel support and the body acceleration sensors are each arranged on a damper strut dome.

The system according to aspects of the invention further comprises a control unit, which is configured to perform a method according to aspects of the invention described hereinabove and thereby to enable a particularly comfortable driving behavior of the vehicle.

BRIEF DESCRIPTION OF THE DRAWINGS

One exemplary embodiment of the present invention is described hereinafter with reference to the accompanying drawings. In the drawings.

DETAILED DESCRIPTION OF THE INVENTION

Figure 1:
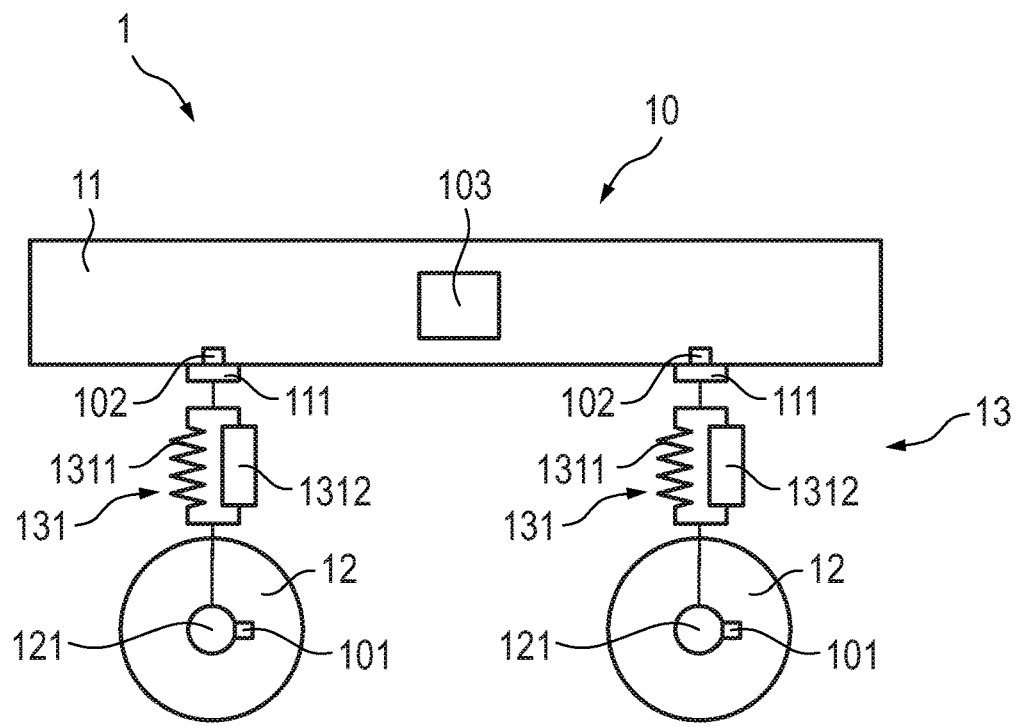
FIG. 1 schematically shows a vehicle having a system according to aspects of the invention for controlling a chassis of the vehicle, FIG. 2 schematically shows the vehicle of FIG. 1 when it is driving over a crest, and FIG. 3 schematically shows the vehicle of FIG. 1 when it is driving over a dip.

FIG. 1 schematically shows a vehicle 1 having a body 11, four wheels 12, and an active chassis 13. The active chassis 13 comprises, for each wheel 12, a spring-damper device 131 having a spring 1311 and an adjustable damper 1312 arranged between a wheel support 121 of the respective wheel 12 and a damper strut dome 111 of the body 11.

The vehicle 1 comprises a system 10 according to aspects of the invention for controlling the active chassis 13. The system 10 comprises four wheel acceleration sensors 101, each arranged on the wheel support 121 of one of the four wheels 12, and four body acceleration sensors 102, each arranged on one of the four damper strut domes 111 of the body 11. The system 10 further comprises a control unit 103.

The control unit 103 is configured to detect vertical wheel accelerations a-12 of all four wheels 12 using the wheel acceleration sensors 101, and determine vertical body accelerations a-11 of the body 11 at the locations of the four damper strut domes 111 using the wheel acceleration sensors 102.

Figure 2:
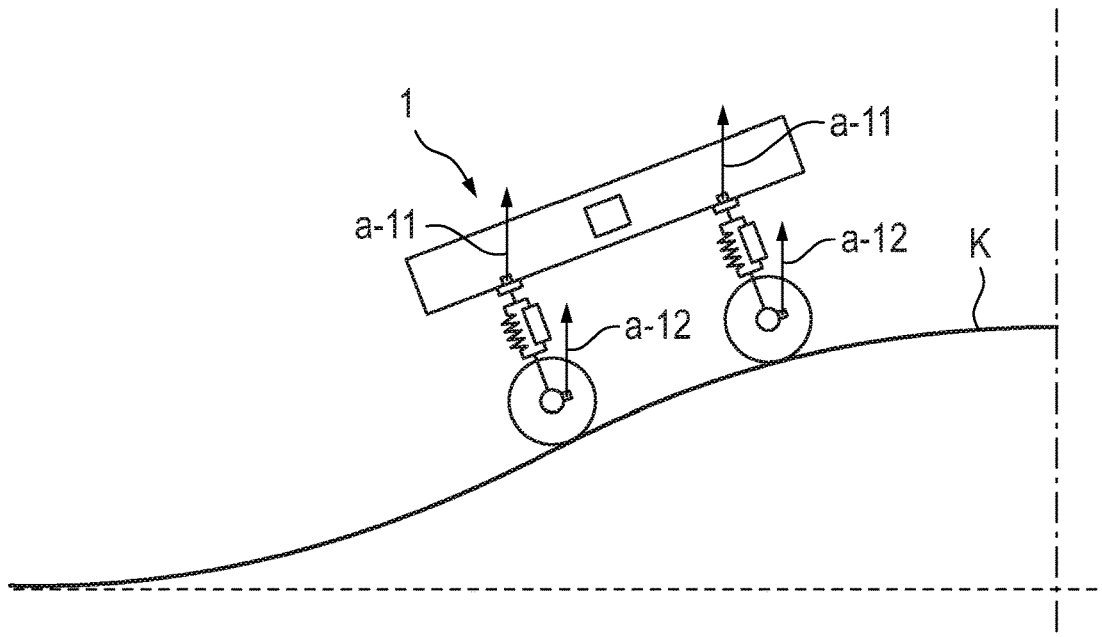
Figure 3:
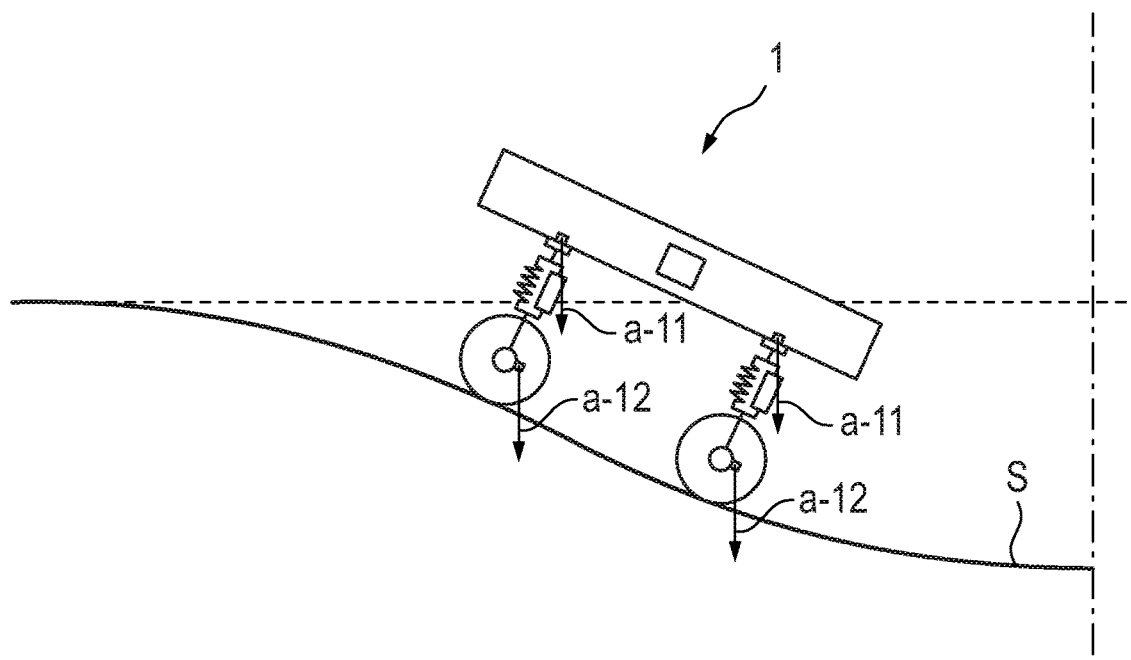

The control unit 103 is further configured to determine, by comparing the vertical wheel accelerations a-12 and the vertical body accelerations a-11, a crest-dip indication indicating whether the vehicle 1 is currently driving over a crest K as shown in FIG. 2, driving over a dip S as shown in FIG. 3, or driving over neither a crest K nor dip S.

Specifically, the control unit 103 is configured to compare progressions of the vertical wheel accelerations a-12 and the vertical body accelerations a-11, whereby low-pass filtering is performed in each case to filter out high-frequency changes of the vertical wheel accelerations a-12 and the vertical body accelerations a-11, such as caused by driving over uneven terrain.

The control unit 103 is further configured to compare a sign of the low-pass filtered vertical wheel accelerations a-12 and vertical body accelerations a-11, and to compare the amplitudes of the low-pass filtered vertical wheel accelerations a-12 and vertical body accelerations a-11 in each case with a threshold value. The vertical wheel accelerations a-12 and the vertical body accelerations a-11 of a front axle are in this case compared to a first threshold value and the vertical wheel accelerations a-12 and the vertical body accelerations a-11 of a rear axis are compared to a second threshold that is less than the first threshold value.

If all of the low-pass filtered vertical wheel accelerations a-12 and vertical body accelerations a-11—as indicated by the upwardly pointing arrows in FIG. 2—have a negative sign and an amplitude greater than the respective threshold value, then the vehicle 1 is assumed to be currently driving over a crest K and the crest-dip indication is adjusted accordingly. If all of the low-pass filtered vertical wheel accelerations a-12 and vertical body accelerations a-11—as indicated by the downwardly pointing arrows in FIG. 3—have a positive sign and an amplitude greater than the respective threshold value, then the vehicle 1 is assumed to be currently driving over a dip S and the crest-dip indication is adjusted accordingly. Otherwise, the vehicle 1 is assumed to be not currently driving over either a crest K or a dip S, and the crest-dip indication is adjusted accordingly.

The control unit 103 is further configured to determine, on the basis of the amplitudes of the vertical wheel accelerations a-12 and vertical body accelerations a-11, crest-dip characteristic information comprising an indication of the characteristic of a crest K or dip S currently being driven over.

The control unit 103 is further configured to control the active chassis 13, in particular the adjustable dampers 1312, on the basis of the particular crest-dip indication and the particular crest-dip characteristic information.

Specifically, the control unit 103 is configured to determine progressions of compression speeds of all spring damper devices 131 and a progression of a body speed of the body 11 to control the chassis 13, and to perform or not perform low-pass filtering of the progressions of the compression speeds as well as high-pass filtering of the progression of the body speed depending on the determined crest-dip indication and crest-dip characteristic information, whereby a corner frequency of low pass filtering of the progressions of the compression speeds is equal to a corner frequency of the high pass filtering of the progression of the body speed.

What is claimed is:

1. A method for controlling a chassis of a vehicle, said method comprising:

detecting a vertical wheel acceleration of a wheel of the vehicle, detecting a vertical body acceleration of a body of the vehicle, determining a crest-dip indication by comparing the vertical wheel acceleration and the vertical body acceleration, wherein the crest-dip indication specifies whether or not the vehicle is currently driving over a crest (K) or a dip(S), determining crest-dip information on the basis of the vertical wheel acceleration and the vertical body acceleration, which crest-dip information comprises an indication of an extent of the crest (K) or dip(S) currently being driven over, and controlling the chassis on the basis of the crest-dip indication and the crest-dip information.

2. The method according to claim 1, wherein, in order to determine the crest-dip indication, a sign of the vertical wheel acceleration is compared to a sign of the vertical body acceleration.

3. The method according to claim 1, wherein, in order to determine the crest-dip indication, the vertical wheel acceleration and the vertical body acceleration are each compared to a threshold value.

4. A method for controlling a chassis of a vehicle, said method comprising:

detecting a vertical wheel acceleration of a wheel of the vehicle, detecting a vertical body acceleration of a body of the vehicle, determining a crest-dip indication by comparing the vertical wheel acceleration and the vertical body acceleration, wherein the crest-dip indication specifies whether or not the vehicle is currently driving over a crest (K) or a dip(S), wherein, in order to determine the crest-dip indication, a progression of the vertical wheel acceleration is compared to a progression of the vertical body acceleration, and controlling the chassis on the basis of the crest-dip indication.

5. The method according to claim 4, further comprising performing a low pass filtering of the progression of the vertical wheel acceleration and the progression of the vertical body acceleration.

6. The method according to claim 1, wherein in order to control the chassis, a progression of a compression speed of a spring-damper device of the vehicle is determined and, depending on the crest-dip indication and/or the crest-dip characteristic information, low-pass filtering of the progression of the compression speed is either performed or not performed.

7. The method according to claim 1, wherein in order to control the chassis, a progression of a body speed of the body of the vehicle is determined and, depending on the crest-dip indication and/or the crest-dip characteristic information, high-pass filtering of the progression of the body speed is either performed or not performed.

8. The method according to claim 7, wherein a corner frequency of low pass filtering of the progression of the compression speed is equal to a corner frequency of the high pass filtering of the progression of the body speed.

9. The method according to claim 1, wherein the vertical wheel acceleration is detected at a wheel support associated with the respective wheel.

10. The method according to claim 1, wherein the vertical body acceleration is detected on a damper strut dome associated with the wheel whose vertical wheel acceleration is detected.

11. The method according to claim 1, wherein the vertical wheel acceleration of all four wheels of the vehicle is detected, and each vertical wheel acceleration is compared to a body acceleration in order to determine the crest-dip indication.

12. A method for controlling a chassis of a vehicle, said method comprising:

detecting a vertical wheel acceleration of a wheel of the vehicle, detecting a vertical body acceleration of a body of the vehicle, determining a crest-dip indication by comparing the vertical wheel acceleration and the vertical body acceleration, wherein the crest-dip indication specifies whether or not the vehicle is currently driving over a crest (K) or a dip(S), and controlling the chassis on the basis of the crest-dip indication, wherein the vertical wheel acceleration of all four wheels of the vehicle is detected, and each vertical wheel acceleration is compared to a body acceleration in order to determine the crest-dip indication, wherein vertical wheel accelerations of the wheels of a front axle are compared with a first threshold in order to determine the crest-dip indication, and wheel accelerations of wheels of a rear axle are compared with a second threshold value that is not equal to the first threshold value.

13. A system for controlling a chassis of a vehicle, said system comprising:

(i) a wheel acceleration sensor for detecting a vertical wheel acceleration of a wheel of the vehicle, (ii) a body acceleration sensor for detecting a vertical body acceleration of a body of the vehicle, and (iii) a control unit configured to:

detect a vertical wheel acceleration of the wheel of the vehicle, detect a vertical body acceleration of the body of the vehicle, determine a crest-dip indication by comparing the vertical wheel acceleration and the vertical body acceleration, wherein the crest-dip indication specifies whether or not the vehicle is currently driving over a crest (K) or a dip(S), determine crest-dip information on the basis of the vertical wheel acceleration and the vertical body acceleration, which crest-dip information comprises an indication of an extent of the crest (K) or dip(S) currently being driven over, and control the chassis on the basis of the crest-dip indication and the crest-dip information.

14. A vehicle comprising the system of claim 13.

* * * * *